(12) United States Patent
Beom

(10) Patent No.: US 6,182,781 B1
(45) Date of Patent: Feb. 6, 2001

(54) PEDAL LOCKING DEVICE FOR A LOADER

(75) Inventor: Jin Seok Beom, Incheon (KR)

(73) Assignee: Daewoo Heavy Industries Ltd. (KR)

(*) Notice: Under 35 U.S.C. 154(b), the term of this patent shall be extended for 0 days.

(21) Appl. No.: 09/122,091

(22) Filed: Jul. 24, 1998

(30) Foreign Application Priority Data

Jul. 28, 1997 (KR) .................................................. 97-35484

(51) Int. Cl.$^7$ ...................................................... B60D 1/28
(52) U.S. Cl. ..................... 180/271; 180/268; 180/269; 180/272; 180/273
(58) Field of Search .................................. 180/273, 272, 180/271, 269, 268

(56) References Cited

U.S. PATENT DOCUMENTS

| | | | |
|---|---|---|---|
| 3,927,776 | * 12/1975 | Steiger | 414/697 |
| 4,388,980 | * 6/1983 | Vig et al. | 180/271 |
| 4,397,371 | * 8/1983 | Lynnes et al. | 180/271 |
| 4,871,044 | * 10/1989 | Strosser et al. | 180/273 |
| 5,050,700 | * 9/1991 | Kim | 180/268 |
| 5,383,532 | 1/1995 | Shonai et al. . | |
| 5,984,040 | * 11/1999 | Lee | 180/271 |

* cited by examiner

Primary Examiner—Brian L. Johnson
Assistant Examiner—Deanna Draper
(74) Attorney, Agent, or Firm—Staas & Halsey LLP

(57) ABSTRACT

A loader includes a vehicle body with a canopy and a seat, a hydraulically operated working implement and a hydraulic control valve unit for controlling flow of working fluid to and from the working implement. Mounted to the canopy of the vehicle body is a seat bar for swinging movement between a lowered position in which an operator is secured to the seat and a raised position in which the operator is released from the seat. A pedal with a dog plate is operatively associated with the control valve unit and tiltable about a horizontal axis between an operative position wherein the control valve unit allows the fluid to be fed to the working implement and a neutral position wherein the control valve unit inhibits delivery of the fluid to the working implement. A detent lever is adapted to swing about a vertical axis between a locking position wherein the detent lever engages with the dog plate to keep the pedal in the neutral position and an unlocking position wherein the detent lever disengages from the dog plate to permit the tilting movement of the pedal. The detent lever can be moved into the locking or unlocking position by means of a lever actuator.

9 Claims, 6 Drawing Sheets

PEDAL LOCKING DEVICE FOR A LOADER

FIELD OF THE INVENTION

The present invention relates generally to loaders and more specifically to a loader pedal locking device capable of preventing inadvertent up/down movement of a boom and unwanted tilting movement of a bucket by way of having a foot pedal locked in its neutral position when a seat bar is not lowered into an operator restraint position.

DESCRIPTION OF THE PRIOR ART

Typical loaders include a vehicle body and a canopy mounted on the body for enclosing an operator's seat. The canopy is provided with a front opening that allows the operator to gain access to the operator's seat. Some types of loaders are expected to run over rough terrain, make sudden stops and turns and are subject to sudden tilting and lurching. A skid steer loader is a type of loader in which the operator often encounters rough ride conditions.

For the operator to be protected safely under the rough ride conditions, need exists for safety devices that can restrain the body of the operator to the seat. The conventional safety devices include a seat bar pivotally mounted to the opposite side walls of the canopy for swing movement about a pivot axis between a raised position and a lowered position. The seat bar remaining in the raised position permits the operator to take or leave the seat through the front opening of the canopy. The operator would be restrained between the seat and the seat bar in case where the seat bar assumes the lowered position. This will keep the operator adhered to the seat even under the rough ride conditions, thus removing the possibility of being thrown from the seat due to the sudden movement of the loader.

There may be however such an instance that a pedal is mistakenly depressed with the seat bar in the raised position, subjecting the boom and/or bucket to sudden movement and hence putting the operator in danger. As a solution to this problem, U.S. Pat. No. 4,388,980 dated Jun. 21, 1983 discloses a loader having a locking assembly which is engaged with a control link when an operator restraint member is in it's disengaged position but is disengaged from the control link when the restraint member is in it's engaged position. The control link serves to, when a pedal is depressed, shift a boom control valve and a bucket control valve from their neutral position into operative positions. Lifting up the restraint member to lock the control link in it's neutral position causes the pedal to be also locked, making it possible to avoid any inadvertent actuation of the boom and the bucket.

The locking assembly taught in the '980 patent appears not to be totally satisfactory in view of the following aspects. First of all, since the locking operation can be effected only when the control link and the pedal are in the neutral position, the control link may be left unlocked if the operator lifts up the restraint member while depressing the pedal in error. Secondly, a significant part of the locking assembly is hidden under the vehicle body and therefore deteriorates it's visibility and accessibility for maintenance. A third drawback is that the locking assembly is highly susceptible of trouble because of it's exposure to mud, sand and the like material on the ground.

SUMMARY OF THE INVENTION

With the foregoing problems in mind, it is therefore an object of the invention to provide a loader that can automatically lock a foot pedal in it's neutral position whenever a seat bar is lifted up.

Another object of the invention is to provide a pedal locking device for a loader which can forcibly return foot pedals into their neutral position and then have them locked in that position independently of one another.

A further object of the invention is to provide a pedal locking device for a loader that can ease maintenance thereof, has a reduced possibility of trouble and permits ready confirmation of trouble, if occured.

In accordance with the invention, there is provided a loader comprising a vehicle body with a canopy and a seat, a control valve unit for controlling flow of working fluid, a seat bar mounted to the canopy of the vehicle body for swinging movement between a lowered position in which an operator is restrained from movement away from the seat and a raised position in which the operator is released from the seat, at least one pedal operatively associated with the control valve unit and tiltable about a horizontal axis between an operative position wherein the control valve unit allows the working fluid to pass therethrough and a neutral position wherein the control valve unit inhibits passage of the working fluid therethrough, dog means connected to the pedal for unitary tilting movement with the pedal, at least one detent lever provided in front of the dog means and swingable about a vertical axis between a locking position wherein the detent lever engages with the dog means to keep the pedal in the neutral position and an unlocking position wherein the detent lever disengages from the dog means to permit the tilting movement of the pedal, and lever actuator means for bringing the detent lever into the locking or unlocking position as the seat bar is caused to move into the raised or lowered position.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
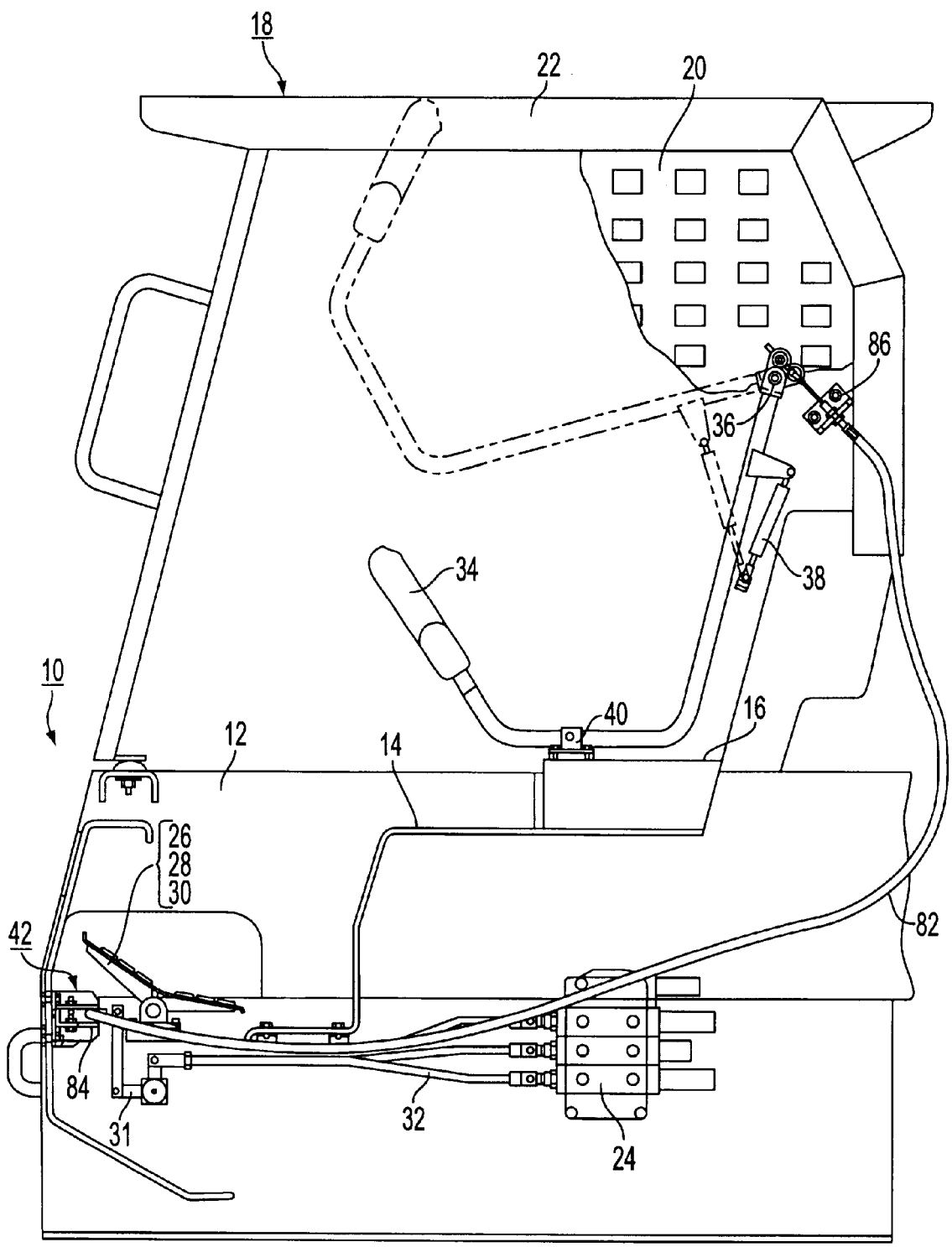
FIG. 1 is a side elevational view showing a skid steer loader employing a pedal locking device in accordance with the invention, with portions thereof removed for clarity.
Figure 2:
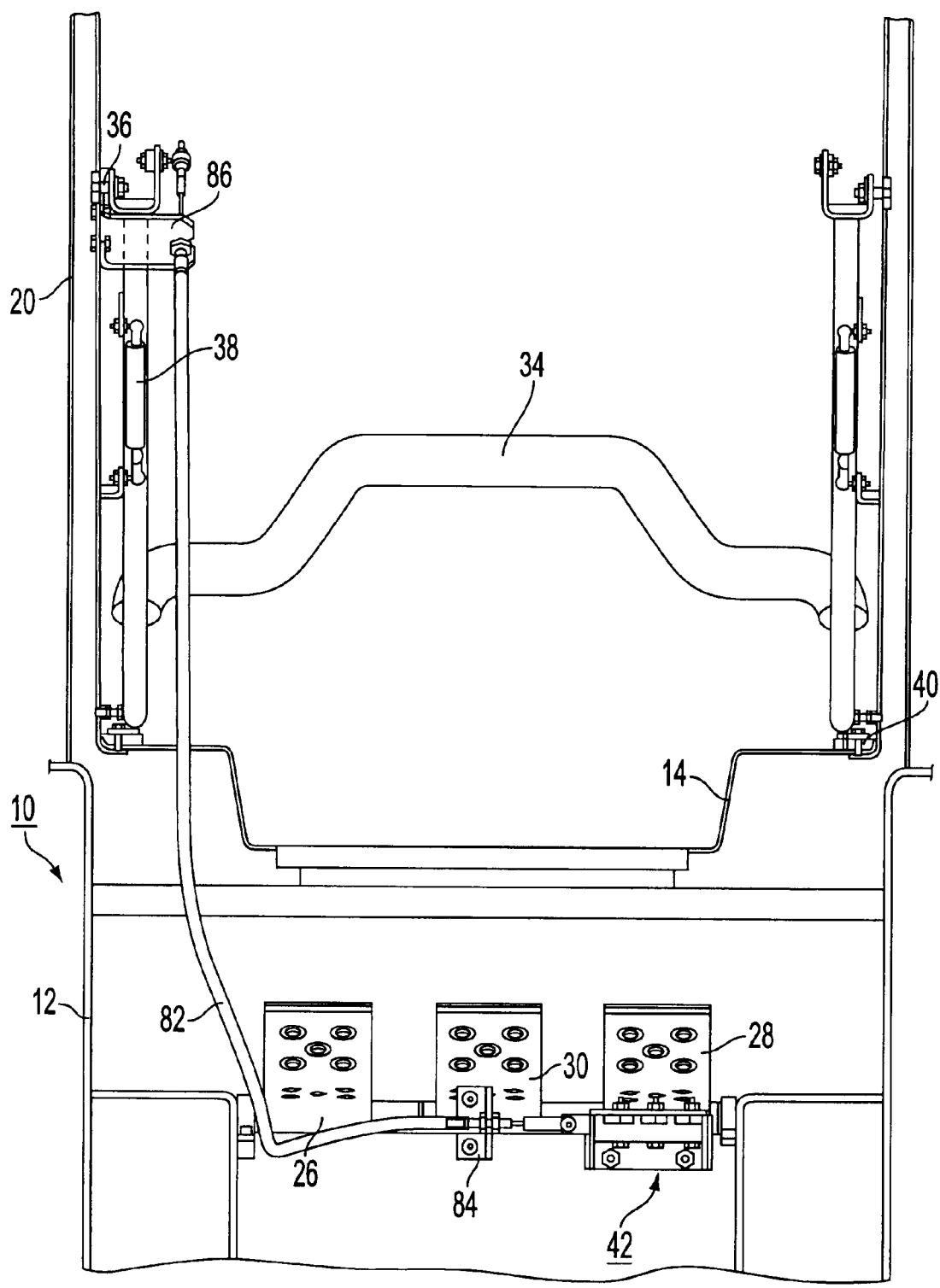
FIG. 2 is a partially enlarged rear view of the skid steer loader, illustrating the structural relationship of a seat bar, a pedal locking device and a foot pedal with respect to a vehicle body and a canopy.

Referring now to FIGS. 1 and 2, it will be noted that a skid steer loader is partially illustrated by way of example which employs a pedal locking device according to the invention. The skid steer loader includes a vehicle body 10 having a side frame 12 and a hood frame 14. An operator's seat 16 is mounted on the hood frame 14, while a canopy 18 is attached to the side frame 12 to enclose the operator's seat 16. The canopy 18 consists of a side wall 20 and a roof 22 and has a front opening for operator entrance and egress.

Provided under the hood frame 14 of the vehicle body 10 is a hydraulic control valve unit 24 that serves to control the working fluid flow to a variety of hydraulic working implements, e.g., a boom cylinder, a bucket cylinder and an attachment cylinder, which are not shown in the drawings. In front of the hood frame 14, such foot pedals as a boom pedal 26, a bucket pedal 28 and an attachment pedal 30 are provided for tilting movement about a horizontal axis. As clearly indicated in FIG. 1, each of the pedals 26, 28, 30 is operatively associated with the hydraulic control valve unit 24 via bell cranks 31 and control links 32 and may be subject to pivotal movement from a neutral position either into a first or second operative position in which the working implements are supplied with the working fluid under pressure to do their works.

The skid steer loader also includes a seat bar 34 mounted to the side wall 20 of the canopy 18 for swinging movement about a pivot axis 36 between a lowered, operator protective position as indicated in solid lines in FIG. 1 and a raised, non-protective position as shown in phantom lines. The seat bar 34 will secure the operator to the seat 16, when in the lowered position, to protect the operator under rough ride conditions, but will allow the operator to leave the seat 16 when in the raised position. At a portion adjacent the pivot axis 36, the seat bar 34 is supported on the vehicle body 10 by a gas spring 38 such that it can have a tendency to constantly remain in one of the lowered position and the raised position. Moreover, on the side frame 12 of the vehicle body 10, there is provided a latch 40 that functions to releasably secure the seat bar 34 in the lowered position.

In accordance with the invention, it is important to note that the boom pedal 26, the bucket pedal 28 and the attachment pedal 30 can be locked in their neutral position by means of a pedal locking device 42 while the seat bar 34 remains in the raised position. On the contrary, swinging the seat bar 34 into the lowered position allows the respective one of the pedals 26, 28, 30 to be tilted into the first or second operative position out of the neutral position.

Figure 3:
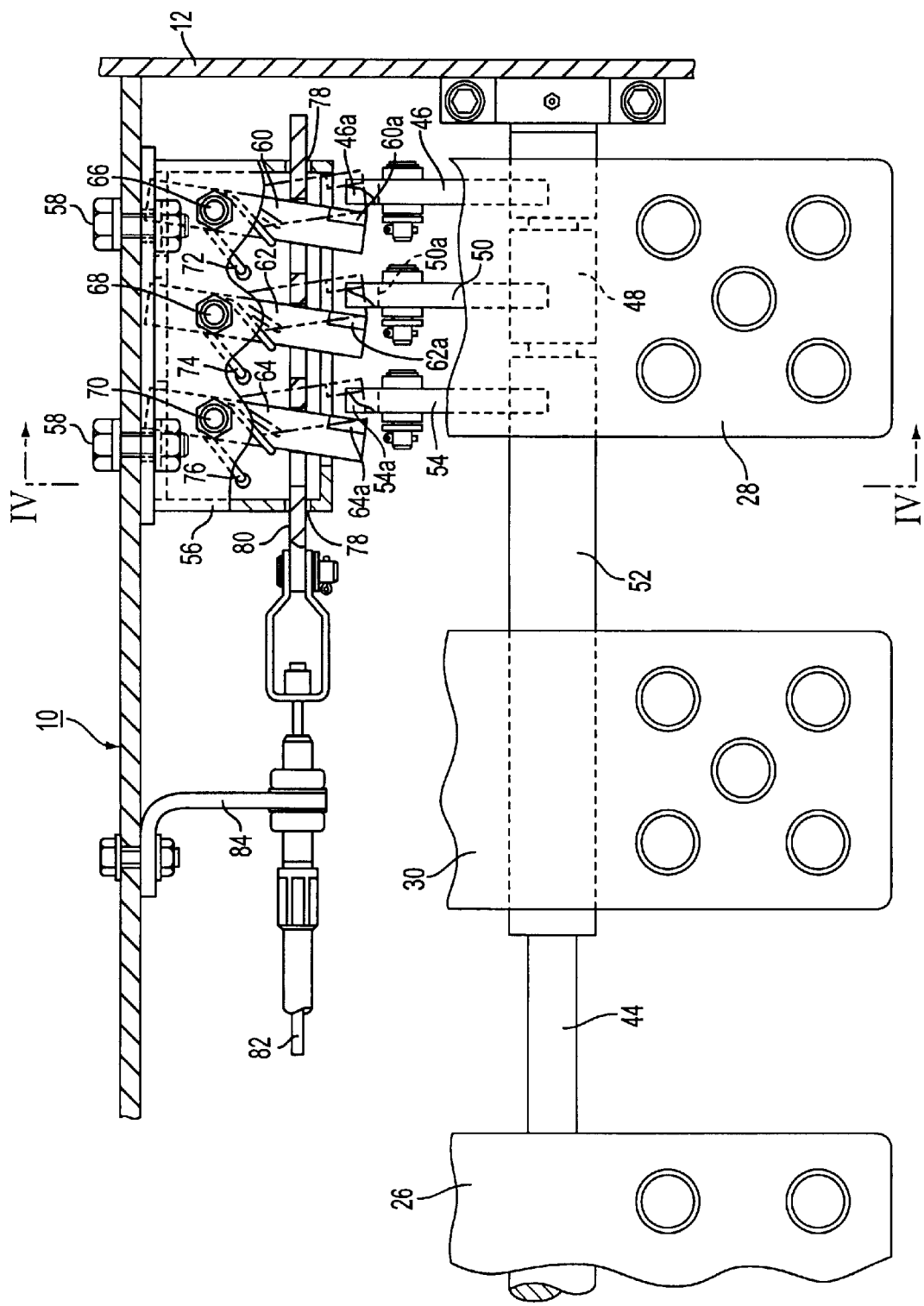
FIG. 3 is an enlarged top view of the pedal locking device in accordance with the invention, with phantom lines indicating detent levers swung into the locking position to have the pedals locked in their neutral position.
Figure 4:
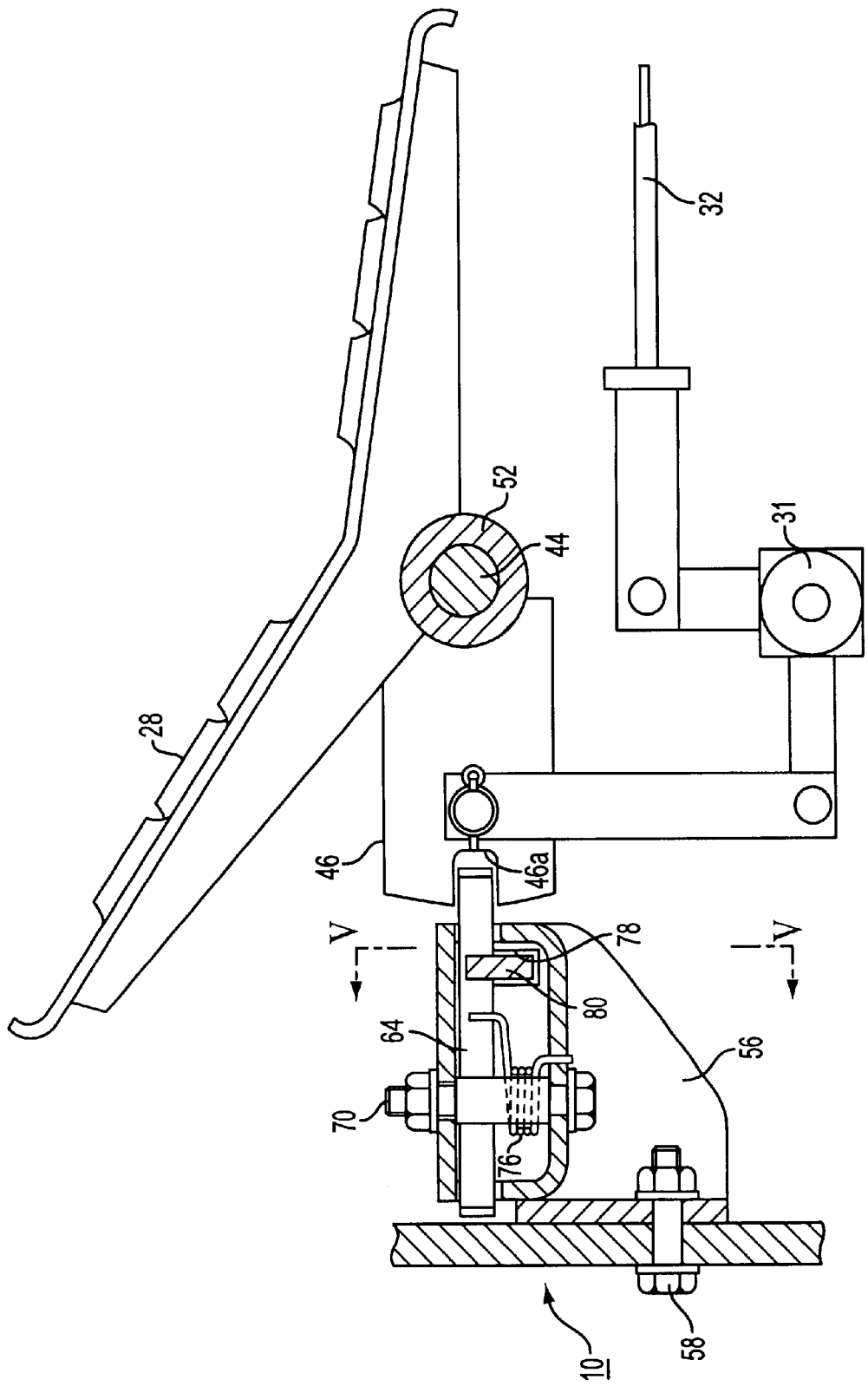
FIG. 4 is a sectional view of the pedal locking device taken along line IV—IV in FIG. 3.
Figure 5:
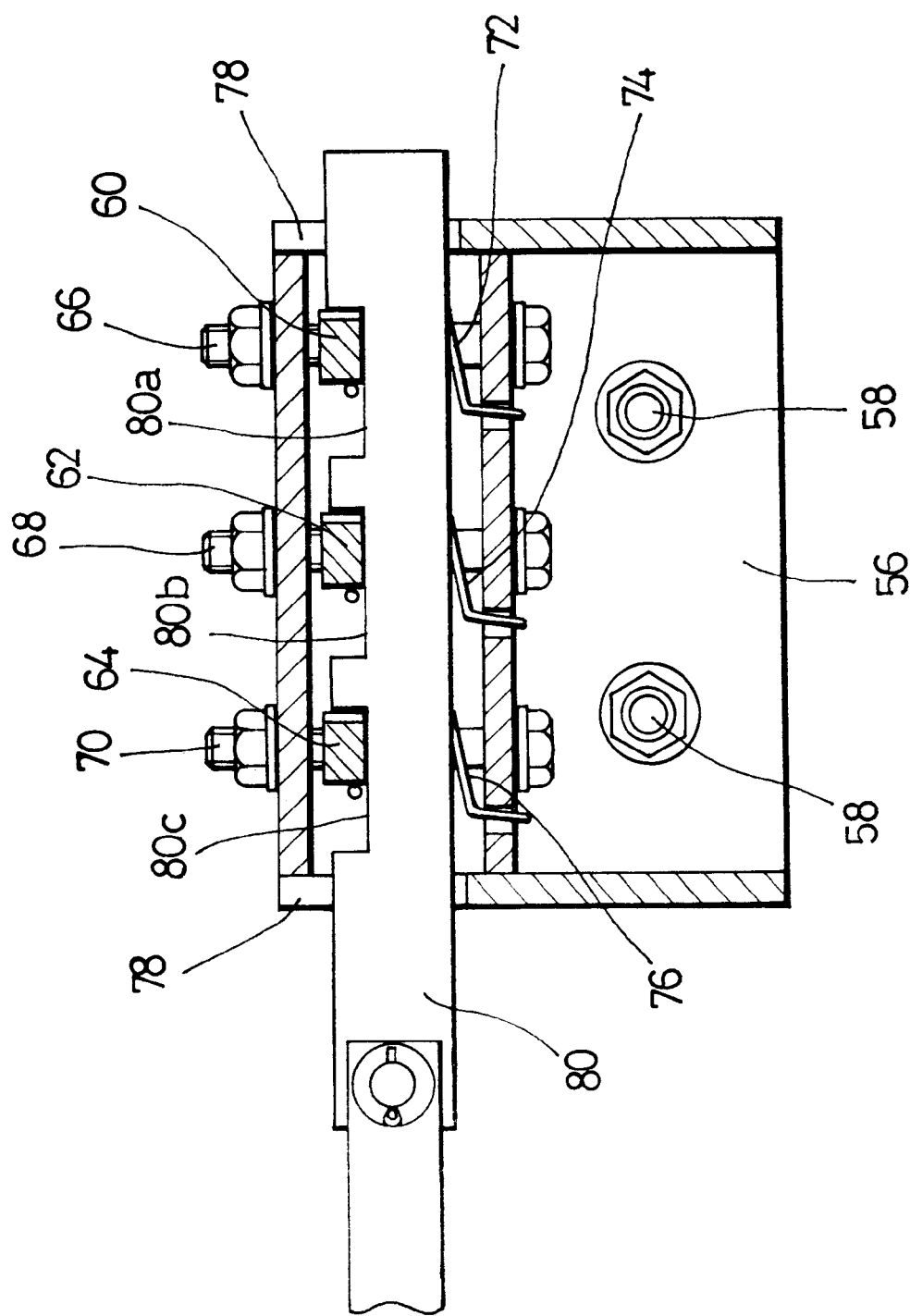
FIG. 5 is a sectional view taken along line V—V in FIG. 4, best showing a slider engaged with the detent levers.

Referring collectively to FIGS. 3 through 5, the inventive pedal locking device 42 includes a first dog plate 46 rigidly interconnected with the boom pedal 26 through a horizontally extending pedal shaft 44 for tilting movement with the boom pedal 26 as a unit. Positioned just aside the first dog plate 46 is a second dog plate 50 which is integrally connected to the bucket pedal 28 by way of a short hub 48 for tilting movement together with the bucket pedal 28. Next to the second dog plate 50, a third dog plate 54 maintains integral connection with the attachment pedal 30 via a long hub 52 for tilting movement therewith. Each of the first through third dog plates 46, 50, 54 has a frontwardly opened locking slot 46a, 50a, 54a at their frontal end and is operatively associated with the hydraulic control valve unit 24 through the bell crank 31 and the control links 32.

In front of the bucket pedal 28, a mounting bracket 56 is fixedly secured to the vehicle body 10 by bolts 58. Corresponding to the first through third dog plates 46, 50, 54, first through third detent levers 60, 62, 64 are swingably mounted to the mounting bracket 56 for swinging movement about the respective one of vertically extending pivot pins 66, 68, 70 between an unlocking position indicated in solid lines in FIG. 3 and a locking position shown in phantom lines.

Each of the detent levers 60, 62, 64 extends toward the corresponding one of the dog plates 46, 50, 54 and has a wedge surface 60a, 62a, 64a at their free end. The wedge surface 60a, 62a, 64a assures that the detent levers 60, 62, 64 engage smoothly and readily with the locking slots 46a, 50a, 54a of the dog plates 46, 50, 54 as the detent levers 60, 62, 64 are caused to swing from the unlocking position into the locking position, particularly at the initial part of the swinging movement of the detent levers 60, 62, 64. Such engagement of the detent levers 60, 62, 64 with the locking slots 46a, 50a, 54a of the dog plates 46, 50, 54 will cause the pedals 26, 28, 30 to be locked in their neutral position against any inadvertent operation.

As clearly shown in FIG. 3, each of the detent levers 60, 62, 64 is normally biased toward the locking position indicated in phantom lines by means of torsion springs 72, 74, 76 retained on the pivot pins 66, 68, 70. This means that the detent levers 60, 62, 64 have a tendency to engage with the dog plates 46, 50, 54 of the pedals 26, 28, 30. The mounting bracket 56 is provided with a guide channel 78 through which a slider 80 is inserted for sliding movement across the detent levers 60, 62, 64 in a transverse direction. It can be seen in FIG. 5 that the slider 80 has three cutouts 80a, 80b, 80c disposed along the length thereof to receive the intermediate portions of the detent levers 60, 62, 64. Turning again to FIGS. 1 and 2, the slider 80 is connected to the rear end of the seat bar 34 through the use of a cable 82 which consists of a core wire and a sheath affixed to the vehicle body 10 and the canopy 18 respectively by means of a slider side bracket 84 and a seat bar side bracket 86.

Figure 6:
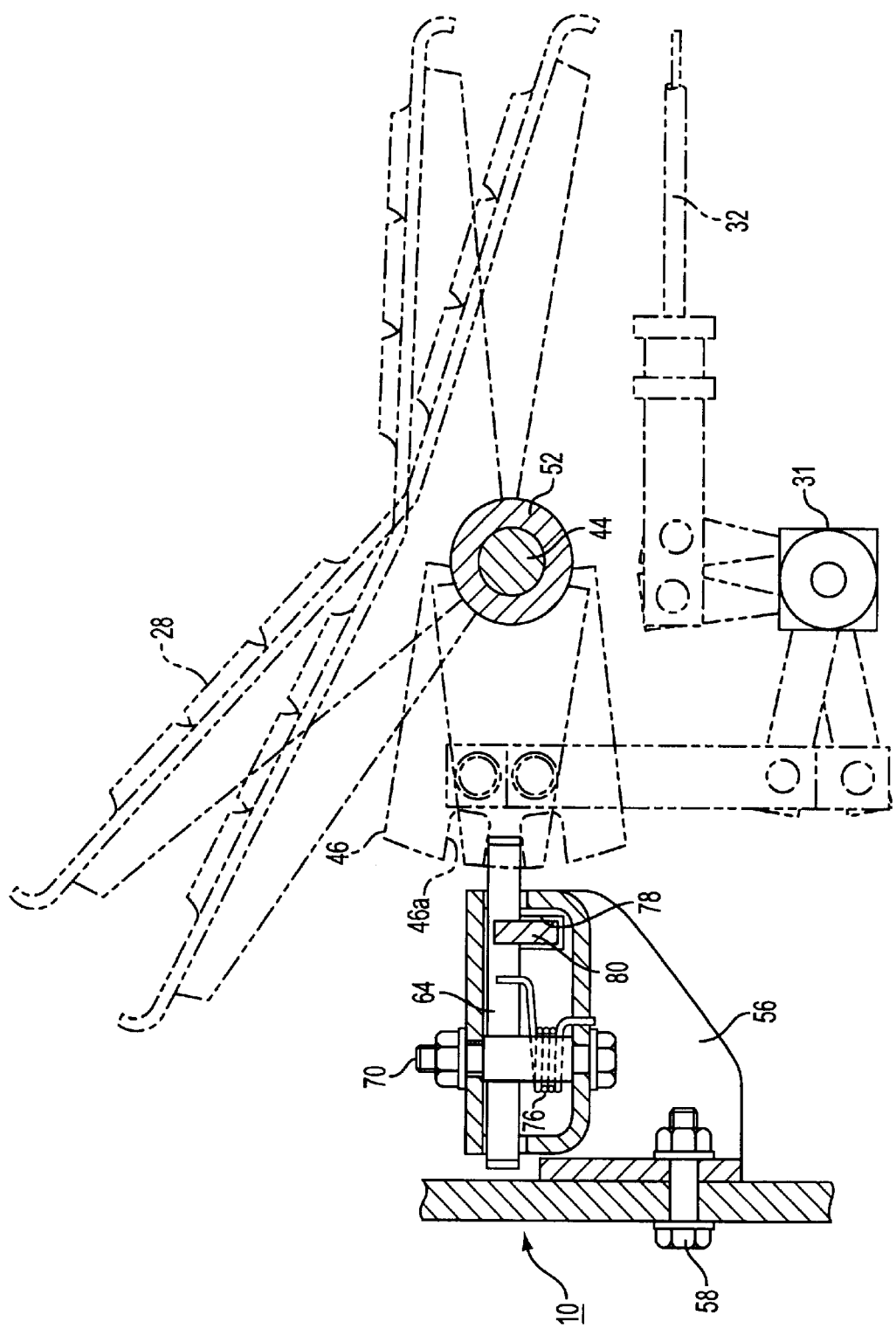
FIG. 6 is a view similar to FIG. 4 but illustrating the pedals tilted from the neutral position into the first and second operative positions.

Swinging the seat bar 34 down into the lowered position shown in solid lines in FIG. 1 will pull the cable 82 and hence the slider 80, causing the detent levers 60, 62, 64 to swing clockwise into the unlocking position against the biasing force of the torsion springs 72, 74, 76. At this moment, the distal ends of the detent levers 60, 62, 64 will disengage from the locking slots 46a, 50a, 54a of the dog plates 46, 50, 54 to release the pedals 26, 28, 30 from the locking condition. Accordingly, the pedals 26, 28, 30 may be tilted into the positions as illustrated in FIG. 6 by the pedal depressing action of the operator. The tilting movement of the pedals 26, 28, 30 is delivered to the hydraulic control valve unit 24 via the bell cranks 31 and the control links 32, which allows the working fluid to be fed to the working implements not shown in the drawings.

As the seat bar 34 is lifted up to the raised position shown in phantom lines in FIG. 1 in order for the operator to leave the seat 16, the slider 80 carried at the end of the cable 82 will be pushed inwards, assuring that the detent levers 60, 62, 64 are swung into the locking position as illustrated in FIG. 3 by the biasing force of the torsion springs 72, 74, 76. This results in the detent levers 60, 62, 64 being brought into engagement with the locking slots 46a, 50a, 54a of the dog plates 46, 50, 54. Under this condition, the pedals 26, 28, 30 remain locked in the neutral position as shown in FIG. 4 and cannot move in any direction even though they are depressed by the operator. While the pedals 26, 28, 30 are kept in the neutral position, the hydraulic valve unit 24 will prevent supply of the fluid to the working implements, thus inhibiting unwanted operation thereof.

The detent levers 60, 62, 64 can move together into the unlocking position by the slider 80 but are capable of swinging into the locking position independently of one another. In other words, if the seat bar 34 is lifted up under the state that one of the pedals 26, 28, 30 is still out of the neutral position, two of the detent levers will be swung into the locking position to lock up the corresponding two pedals but the remaining one of the detent levers cannot swing into the locking position until and unless the last pedal is returned to the neutral position.

While the invention has been shown and described with reference to a preferred embodiment, it should be apparent to one of ordinary skill in the art that many changes and modifications may be made without departing from the scope of the invention as defined in the claims.

What is claimed is:

1. A loader comprising:

a vehicle body with a canopy and a seat;

a hydraulic control valve unit for controlling flow of working fluid therethrough;

a seat bar mounted to the canopy of the vehicle body for swinging movement between a lowered position in which an operator is restrained from movement away from the seat and a raised position in which the operator is released from the seat;

at least one pedal operatively associated with the control valve unit and tiltable about a horizontal axis between an operative position wherein the control valve unit allows the working fluid to pass therethrough and a neutral position wherein the control valve unit inhibits passage of the working fluid therethrough;

a dog plate attached to the pedal for unitary tilting movement with the pedal and having a locking slot opened frontwards;

at least one detent lever provided in front of the dog plate and rotatable mounted to a mounting means to rotate about a vertical axis between a locking position, wherein the detent lever engages with the locking slot of the dog plate to keep the pedal in the neutral position and an unlocking position wherein the detent lever disengages from the locking slot to permit the tilting movement of the pedal; and lever actuator means for bringing the detent lever into the locking or unlocking position as the seat bar is caused to move into the raised or lowered position.

2. The loader as recited in claim 1, wherein the detent lever has a wedge surface which comes into engagement with the locking slot of the dog plate at an initial part of the swinging movement into the locking position of the detent lever.

3. The loader as recited in claim 1, wherein the lever actuator means comprises first actuator means for biasing the detent lever into the locking position while the seat bar is in the raised position.

4. The loader as recited in claim 3, wherein the first actuator means comprises a torsion spring.

5. The loader as recited in claim 3, wherein the lever actuator means comprises second actuator means for causing the detent lever to swing into the unlocking position as the seat bar is brought into the lowered position.

6. The loader as recited in claim 5, wherein the second actuator means comprises a slider movable across the detent lever and remaining engaged with the detent lever and a cable connected to the slider at a first end and to the seat bar at a second end so that the detent lever can be swung into the unlocking position out of engagement with the pedal as the seat bar is brought into the lowered position.

7. A loader comprising:

a vehicle body with a canopy and a seat;

a hydraulic control valve unit for controlling flow of working fluid therethrough;

a seat bar mounted to the canopy of the vehicle body for swinging movement between a lowered position in which an operator is restrained from movement away from the seat and a raised position in which the operator is released from the seat;

at least one pedal operatively associated with the control valve unit and tiltable about a horizontal axis between an operative position wherein the control valve unit allows the working fluid to pass therethrough and a neutral position wherein the control valve unit inhibits passage of the working fluid therethrough;

a dog plate attached to the pedal for unitary tilting movement with the petal and having a locking slot opened frontwards;

at least one detent lever provided in front of the dog plate and rotatable mounted to a mounting means to rotate about a vertical axis between a locking position wherein the detent lever engages with the locking slot of the dog plate to keep the pedal in the neutral position and an unlocking position wherein the detent lever disengages from the locking slot to permit the tilting movement of the pedal;

first actuator means for biasing the detent lever into the locking position while the seat bar is in the raised position; and second actuator means for causing the detent lover to swing into the unlocking position as the seat bar is brought into the lowered position.

8. The loader as recited in claim 7, wherein the second actuator means comprises a slider moveable across the detent lever and remaining engaged with the detent lever and a cable connected to the slider at a first end and to the seat bar at a second end so that the detent lever can be swung into the unlocking position out of engagement with the pedal as the seat bar is brought into the lowered position.

9. The loader as recited in claim 8, wherein the mounting means comprises a mounting bracket fixedly secured to the vehicle body for swingably holding the detent lever, the mounting bracket provided with a guide channel receiving the slider in a slidable manner.

* * * * *